United States Patent [19]

Keller et al.

[11] 4,448,272

[45] May 15, 1984

[54] METHOD AND APPARATUS FOR FEEDING, WEIGHING AND RELEASING FIBER

[75] Inventors: Alex J. Keller, Clover, S.C.; Joseph R. Williams, Kings Mountain, N.C.; Erhard A. Fechner, Gastonia, N.C.; Akiva Pinto, Gastonia, N.C.; James A. King, Jr., Greensboro, N.C.; Charles D. Crawford, Burlington, N.C.; Riley C. Maness, Greensboro, N.C.

[73] Assignee: Platt Saco Lowell Corporation, Easley, S.C.

[21] Appl. No.: 310,213

[22] Filed: Oct. 9, 1981

[51] Int. Cl.³ .................. G01G 23/22; G01G 19/52; G01G 13/24

[52] U.S. Cl. .......................................... 177/1; 177/25; 177/50; 177/114

[58] Field of Search ............... 177/50, 1, 55, 25, 114

[56] References Cited

U.S. PATENT DOCUMENTS

| 2,037,484 | 4/1936 | Raymer et al. | 177/50 |
|---|---|---|---|
| 2,697,580 | 12/1954 | Howard | 177/50 X |
| 3,333,648 | 8/1967 | Dodd | 177/55 |
| 3,484,813 | 12/1969 | Davies | 177/50 |
| 3,620,316 | 11/1971 | Henry et al. | 177/50 |
| 3,862,666 | 1/1975 | Muskat et al. | 177/50 |
| 4,100,984 | 7/1978 | Klopfenstein et al. | 177/50 |
| 4,137,976 | 2/1979 | Grayson, Jr. | 177/50 X |
| 4,272,824 | 6/1981 | Lewinger et al. | 177/50 X |
| 4,310,060 | 1/1982 | Phillips, Jr. et al. | 177/70 |
| 4,366,872 | 1/1983 | Brunnschweiler et al. | 177/165 X |

FOREIGN PATENT DOCUMENTS 1303459 1/1973 United Kingdom ............ 177/70 X

*Primary Examiner*—George H. Miller, Jr.
*Attorney, Agent, or Firm*—Richards, Shefte & Pinckney

[57] ABSTRACT

Method and apparatus for feeding, weighing and releasing a predetermined quantity of fiber in reoccurring cycles for use in a fiber blending operation or the like whereby the quantity of fiber released in each cycle is maintained at an essentially constant and preselected level, which includes means for sensing the actual weight of fiber dumped from a weigh pan or container, comparing such weight with a constant preset desired weight setting, and varying the weight of fiber delivered during the next cycle to compensate for any differences between the preset weight and the actual weight dumped during the preceding cycle.

8 Claims, 5 Drawing Figures

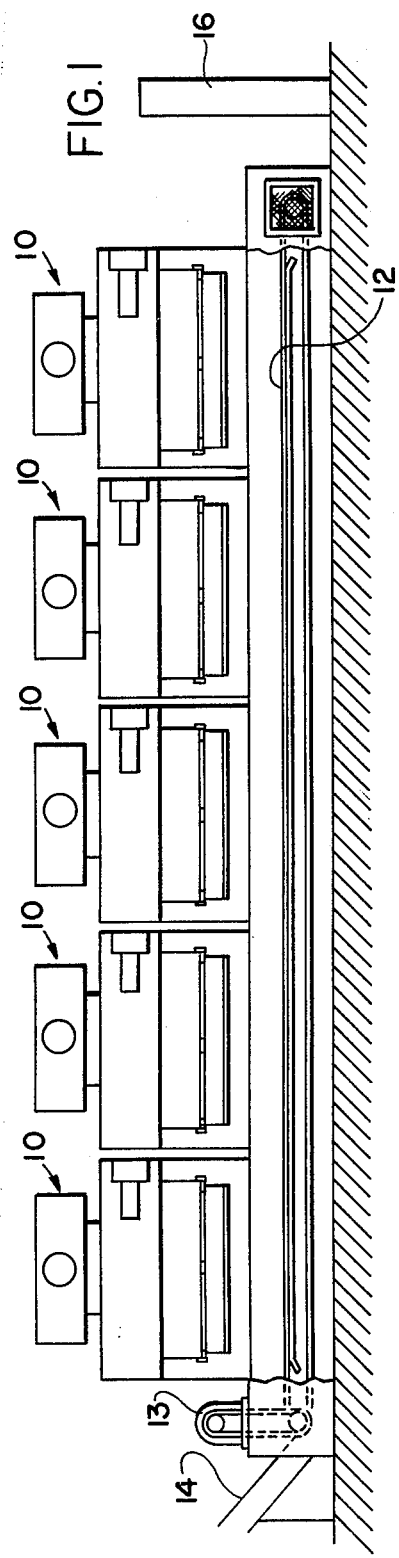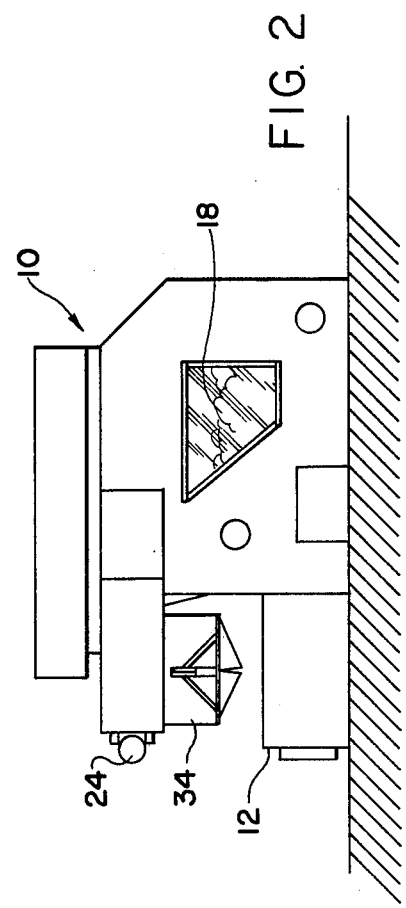

METHOD AND APPARATUS FOR FEEDING, WEIGHING AND RELEASING FIBER

BACKGROUND OF THE INVENTION

As is well known in the textile field, many fabrics are made from yarn that is composed of a blend of different fibers, including natural and synthetic fibers, and the quality of such fabrics depend to a significant extent upon the uniformity of the blend of the different fibers from which the yarn is made.

The blending of fibers in preparation for yarn formation is commonly carried out by providing a plurality of fiber feeding machines arranged in a bank to deposit measured quantities of fiber onto a conveyor or the like, a typical example of such a system being disclosed in Lytton U.S. Pat. No. Re. 25,609. Each fiber feeding machine generally handles a different type of fiber which is fed within the machine to a weigh pan until a predetermined weight of fiber is collected therein, whereupon pivoted doors at the bottom of the weigh pan are thereafter opened to release the predetermined weight of fiber which falls to a conveyor or the like for transportation with other fiber batches to blending equipment.

Since, as indicated above, the uniformity of the ultimate blend of fibers is important, it will be apparent that the accuracy of the weight of each batch of fiber deposited on the conveyor is quite significant in arriving at a blend having a desired uniformity and predictability. A known method of controlling the accuracy of the weight of fiber deposited onto the conveyor has been to provide a mechanical arrangement by which the weigh pan is mounted at one end of a pivoted arm which includes counterweights mounted at the other end of the arm and movable therealong, whereby when a predetermined weight of fiber, as determined by the position of the counterweights on the arm, is collected in the weigh pan, the arm will pivot and thereby operate an electrical switch that stops further feeding of fiber to the weigh pan. Typical examples of mechanical arrangements of the foregoing types are disclosed in greater detail in the above-mentioned Lytton U.S. Pat. No. Re. 25,609 and Lytton U.S. Pat. No. 3,196,967.

While such mechanical arrangements provide a reasonable degree of control for the weight of fiber which are ultimately delivered to the blending equipment, such arrangements also have certain drawbacks in terms of the accuracy and uniformity of the actual fiber weight which is released from the fiber feeding equipment during each fiber release cycle. More specifically, the pivoted arm and movable counterweight arrangement presents inherent mechanical tolerances which may make it difficult to obtain a generally precise weight setting for the collected fiber in the weigh pan. Moreover, since the weigh pan itself is mounted at the end of the pivoted arm, any fly or fiber which attaches itself to the weigh pan or the components associated therewith will offset to some extent the effect of the counterweights whereby the arm will pivot before the desired weight of fiber has been collected in the weigh pan. Similarly, it is not uncommon for a portion of the collected fiber in the weigh pan to cling to the interior walls thereof and not fall from the weigh pan when the doors are opened to release the fiber, and it will be apparent that this clinging fiber may reduce the weight of fiber dumped during a given cycle.

Another method for weighing fibers is also disclosed in Grayson U.S. Pat. No. 4,137,976, which is directed primarily to a system for forming a plurality of bales of fiber, each of which has a uniform total weight so that sellers and buyers of staple textile fiber will know substantially the exact weight measure of each bale and the total weight of fiber transferred in any particular transaction. In this system, cut textile tow is delivered to a baling press or the like in a succession of batches, each batch being cyclically collected in and dumped from a container. The container is arranged with a load cell that measures the cumulative weight of the container and the fiber collected therein and generates signals indicative of the fiber weight in the container, and this signal is transmitted to an electronic control system, including a microprocessor unit, which stops the feeding of fiber to the container when a predetermined fiber weight has been reached, and which provides a total of all of the actual fiber weight released from the container in preceding cycles and adjusts the weight of fiber released in subsequent cycles for the purpose of controlling the total weight of fiber delivered to the baling press, whereby each bale formed by this system will have a generally uniform and predetermined total weight.

Thus, the foregoing system, insofar as it measures the actual weight of the fiber released from the container, overcomes some of the aforementioned drawbacks associated with the mechanical arm and counterweight arrangement, but such system automatically varies the fiber weight released during each cycle solely in response to differences between the actual cumulative total weight of fiber theretofor delivered from the container and the predetermined cumulative total weight which is desired to be delivered in connection with the formation of a bale having an accurate and predictable total weight. While this total weight concept may have advantages in carrying out the intended purpose of the Grayson invention, namely the formation of bales having a uniform weight, such concept would have practical limitations if applied to continuous blending systems where the emphasis is on continuously delivering a series of fiber batches, each of which is substantially equal in weight to the other batches delivered to the blending line.

SUMMARY OF THE INVENTION

The method and apparatus of the present invention is directed toward the feeding, weighing and releasing of predetermined quantity of fiber to a conveyor or the like, such as a conveyor for delivering the fiber to blending apparatus, in continuously reoccurring cycles. Fiber feeding apparatus is provided to selectively deliver fiber to a weigh pan or container which receives and collects the fiber therein, and which releases the fiber collected therein to a conveyor or the like for ultimate blending with other batches of fiber.

In accordance with the present invention, apparatus is provided for accurately sensing the weight of the fiber collected in the weigh pan during each of the aforesaid reoccurring cycles, and for generating a signal that is proportional to such weight. A control system is provided which has the capacity to receive the aforesaid generated signals, to determine the actual weight of fiber released from the weigh pan, and to compare this determined weight for each cycle with a preset weight that corresponds to the weight that is desired to be released during each said cycle. The control system then operates to regulate the aforesaid fiber feeding apparatus so as to vary the quantity of fiber delivered to the weigh pan during the next cycle by an amount proportional to the difference between such determined weight and the preset weight for the immediately preceding cycle.

By virtue of this unique control system, the actual weight of the fiber delivered by the weigh pan during each cycle is compared with a desired or preset weight for such batches and any variation between these weights is automatically and immediately compensated for by varying the weight of fiber delivered by the weigh pan during the next cycle whereby batches of substantially uniform weight will be delivered to the blending apparatus on a continuing basis and minor variations in batch weights are compensated for to provide an average batch weight that is quite close to the preset weight for a batch.

In the preferred embodiment of the present invention, the control system acts to establish, for each cycle, a predetermined weight level at which the feeding of fiber to the weigh pan 34 is stopped, and this predetermined weight level is determined by adding to or subtracting from the weight of fiber dumped in the immediately preceding cycle by an amount equal to a fractional portion (e.g. one-half) of the difference between such preset weight and the actual weight dumped during the immediately preceding cycle. For example, if the particular blending operation dictates a preset weight of twenty-five ounces of fiber to be dumped by a weigh pan during each cycle, and if the actual weight dumped during a cycle is twenty-three ounces, the control system will establish a new predetermined weight level for the next cycle at twenty-four ounces, or the actual weight of twenty-three ounces dumped in the preceding cycle plus one-half the difference between twenty-five ounces and twenty-three ounces. This partial compensation tends to provide a gradual and more even approach to reaching the preset weight than would be the case if the entire weight differential (e.g. 2 ounces in the example above) is added to the actual weight for the next cycle so as to perhaps cause widely fluctuating weights above and below the preset weight, but full compensation for the next cycle could be used, if desired, in the present invention.

DESCRIPTION OF THE DRAWINGS

FIG. 1 is a front view showing, generally, a plurality of fiber feeding machines for delivering measured quantities of fiber to a blending operation;

FIG. 2 is a side elevational view of one of the fiber feeding machines illustrated in FIG. 1;

DESCRIPTION OF THE PREFERRED EMBODIMENT

Figure 3:
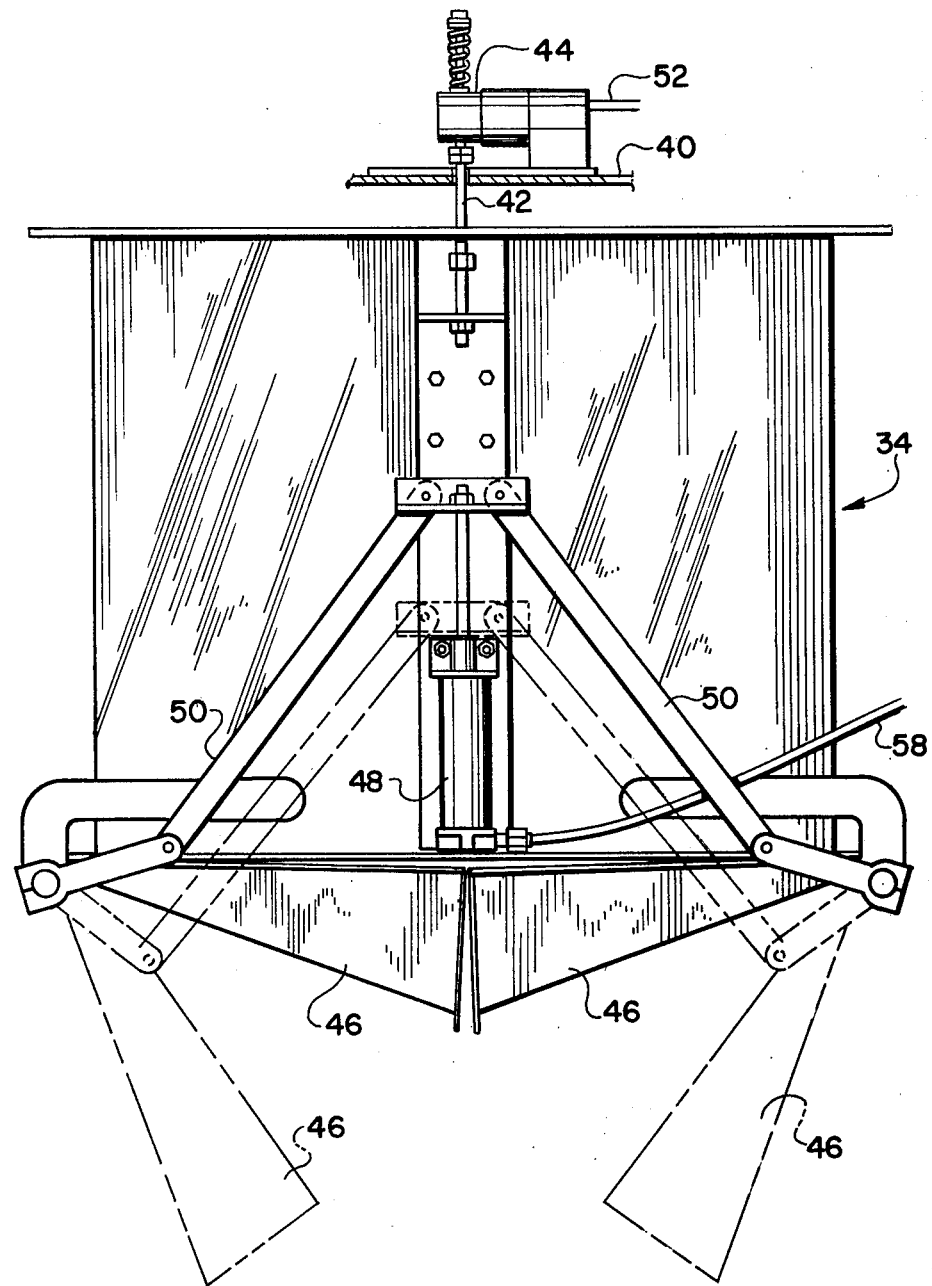
FIG. 3 is a side elevational view of the weigh pan incorporated in the fiber feeding machines.

Looking now in greater detail at the accompanying drawings, FIG. 1 illustrates a typical arrangement of a plurality of generally conventional fiber feeding machines 10 aligned along a conveyor 12 operated by a motor 13 for delivering measured quantities of fiber to the conveyor 12 in a manner to be described presently, and the conveyor 12 is operable to deliver such fiber to conventional blending apparatus 14 shown in part in FIG. 1, under the control of a main control panel 16.

Figure 4:
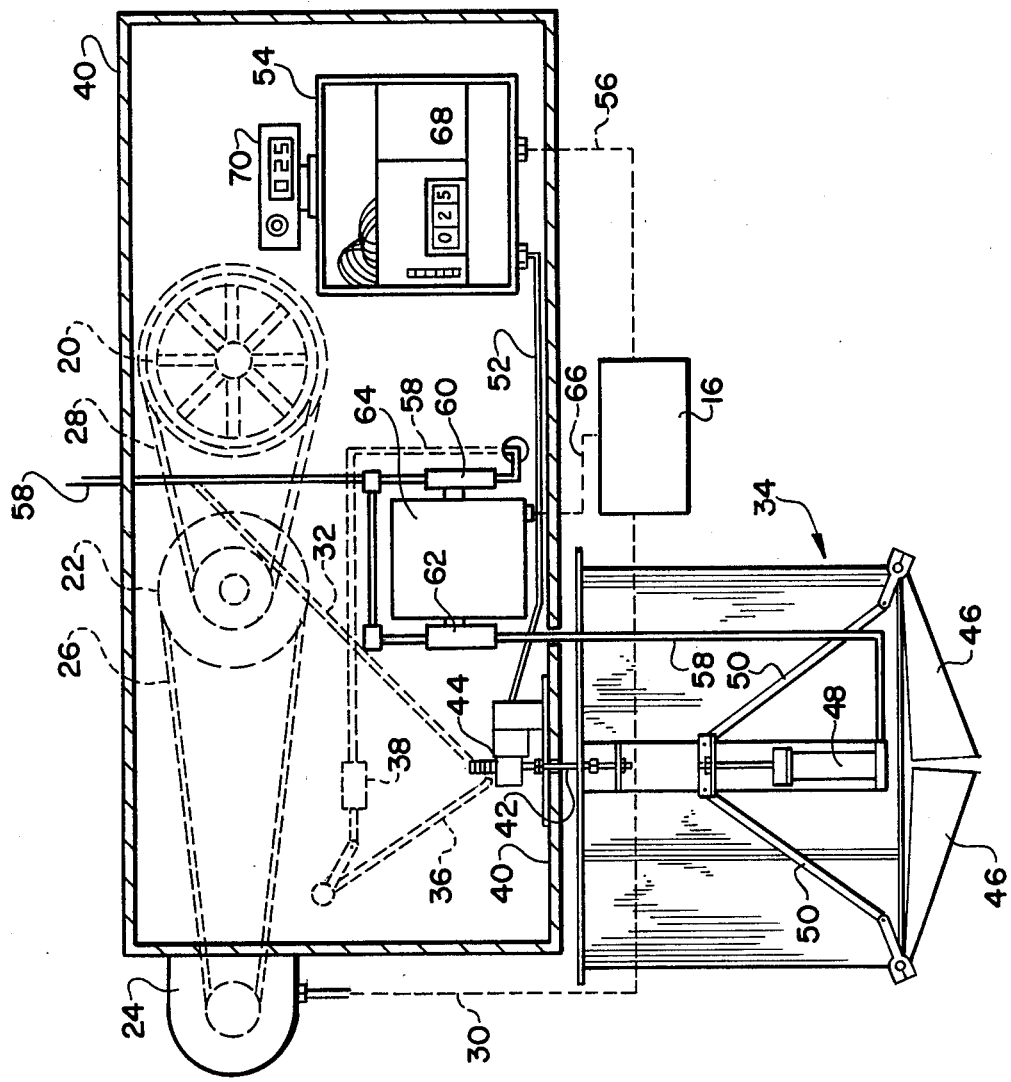
FIG. 4 is a side elevational view of a portion of a fiber feeding machine and illustrating the components thereof associated with the present invention.

As best illustrated in FIGS. 2-4, each fiber feeding machine 10 includes a storage area 18 to which fiber is delivered by any suitable means, and such fiber is moved upwardly from the storage area 18 on a conventional inclined spiked apron (not shown) driven by a pulley 20, and the fiber is doffed from the spiked apron by a conventional doffer roll (not shown) driven by a pulley 22, the pulley 22 being rotated by a belt drive 26 from an electric motor 24 and the pulley 20 being rotated by a belt drive 28 extending from the pulley 22 as shown in FIG. 4, whereby the operation of the apron and the doffer roller are controlled by the motor 24 which is connected by an electrical line 30, shown diagrammatically in FIG. 4, to the main control panel 16. The fiber feeding machine includes an inclined wall 32 along which fiber from the doffer roll is delivered to the top opening of a weigh pan or container 34, and a pivoted plate 36 is arranged to be operated by an air cylinder 38 to move between a first closed position (shown in FIG. 4) to block the flow of fiber to the weigh pan 34 and second open position, spaced from the wall 32, to permit the fiber to be delivered to the weigh pan 34. It will be understood that other known arrangements could be used in lieu of the pivoted plate 36 to stop the flow of fiber to the weigh pan 34.

The weigh pan 34 is hung from the frame 40 of the fiber feeding machine 10 by one or more rods or cables 42 extending from a conventional load cell 44, which may include overload protection means, supported on the frame 40, and the weigh pan 34 includes a pair of pivoted doors 46 operated by an air cylinder 48 through a linkage 50 between a closed position, shown in full lines in FIG. 3, and an open position, shown in dotted lines in FIG. 3, for releasing fiber contained in the weigh pan 34 to the conveyor 12. As is well known in the art, the load cell 44 generates an electrical signal that is proportional to, and indicative of, the weight of the weigh pan 34 and any fiber collected therein, and this signal is transmitted through electrical line 52 to an electronic microprocessor unit 54 mounted to the frame of the fiber feeding apparatus 10 and connected to the main control panel 16 by an electrical line 56 shown diagrammatically in FIG. 4. The aforesaid air cylinders 38 and 48 are operated by air received from an air line 58 under the control of solenoid-operated valves 60 and 62, respectively, and the valves 60 and 62 are controlled through an electrical junction box 64 that is connected to the main control panel 16 through an electrical line 66 shown diagrammatically in FIG. 4.

In a typical operation, the plurality of fiber feeding machines 10 operate in constantly reoccurring cycles in the following manner. At the end of one cycle, the conveyor 12 is moved by its motor 13 a predetermined distance, usually corresponding to a distance of one-half of the spacing between adjacent fiber feeding machines 10, whereupon the conveyor 12 is automatically stopped by a cam and switch arrangement (not shown) on the conveyor drive. During this movement, a signal from the main control panel starts the motors 24 of all of the machines 10 so that fiber is delivered from the storage area 18 of each machine 10 to the weigh pans 34 as described above, the pivoted plate 36 being maintained at its open position by operation of the air cylinder 38 in response to a signal from the main control panel 16 which operates the solenoid valve 60. As the fiber collects in the weigh pans 34 of the machines 10, the load cell 44 of each machine 10 operates independently to sense the weight of such fiber and to generate a signal indicative of such weight, and such signal is transmitted to the microprocessor unit 54 which in turn sends a signal to the main control panel 16 when such weight reaches a certain level to stop the motors 24 and close the pivot plate 36 of the machine 10, whereupon no further fiber is delivered to the weigh pan 34 of such machines 10. When the weigh pans 34 of all of the machines 10 have collected their predetermined fiber weights and the further feeding of fiber thereto has ceased, the main control panel 16 simultaneously operates the solenoid valves 62 of all of the machines so that the air cylinders 48 act to open the pivoted doors 46 of each weigh pan 34, whereby the fiber collected in all of the weigh pans 34 is simultaneously released and permitted to fall to the conveyor 12. The main control panel 16 then operates the solenoid valves 62 and air cylinders 48 to close the pivoted doors 46, and, after a short delay, starts the motor 24 and opens the pivoted plate 36 of each machine 10, and starts the conveyor motor 13 to move the conveyor 12 and commence a new cycle.

In accordance with the present invention, a unique control system is provided for regulating the feeding, weighing and releasing of the fiber delivered to the weigh pan 34 of the individual machines 10, such control system including the load cell 44 and the microprocessor unit 54. It will be understood that the details of the microprocessor unit 54 itself form no part of the present invention, except to the extent that it provides one commercially available programmable control means suitable for use in carrying out the steps of the present invention, the programming techniques for adapting a microprocessor unit to such steps being well known in the microprocessor and programmable control means art.

Figure 5:
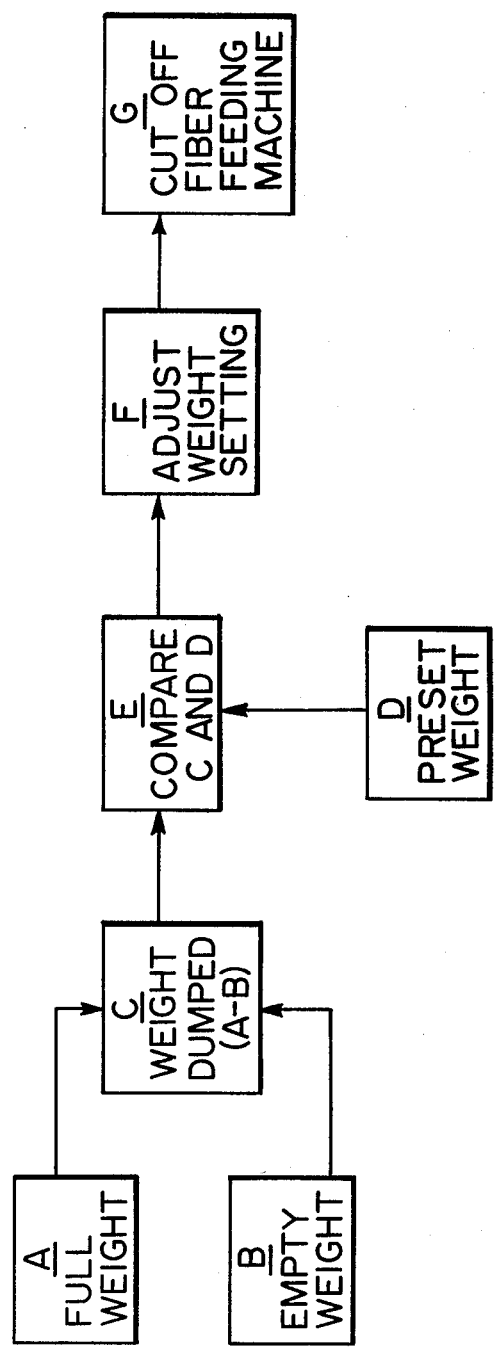
FIG. 5 is a diagrammatic flow chart illustrating the control steps of the present invention.

The sequential steps of the control system of the present invention are illustrated diagrammatically in FIG. 5 for each of the aforesaid reoccurring cycles of each of the fiber feeding machines 10. It should be noted initially that it is desirable, as discussed above, to have each machine 10 dump a constant preset weight of fiber onto the conveyor 12 during each cycle, and this preset weight is determined prior to commencing the operation of the plurality of machines 10 in accordance with a number of variables, such as the nature and number of the fibers being blended and the desired make-up of the blend. Once this preset weight has been determined, the microprocessor unit 54 senses such preset weight during each reoccurring cycles, and it is preferred that this preset weight be continuously displayed as shown by the digital switches 48 in FIG. 4 which, in this instance, has been set at twenty-five ounces. In the diagrammatic showing of FIG. 5, this preset weight is represented by box D.

The load cell 44 constantly senses the weight of the weigh pan 34 and any fiber collected therein, and transmits signals to the microprocessor unit 54 to indicate such weight. The microprocessor unit 54 is programmed to receive such signal and determine the maximum weight level sensed by the load cell 44 during each cycle, and this maximum weight level is temporarily retained in the memory of the microprocessor unit 54 as the full weight of the weigh pan 34 and fiber, which is represented by box A in FIG. 5. This maximum weight level, which includes the total weight of the weigh pan 34 and any fiber collected therein, is quite accurately determined by the microprocessor unit 54 because it is programmed to make this determination by recognizing when the total weight is no longer increasing, whereby, for example, even fiber that may drift into the weigh pan 34 after the pivoted plate 36 is closed will be included in the determined maximum or full weight.

After the doors 46 of the weigh pan 34 have been opened and the fiber therein released as described above, a signal from the load cell 44 is transmitted to the microprocessor unit 54 representing the weight of the now empty weigh pan 34, such signal being represented by box B in FIG. 5. The empty weight determination is also quite accurate because the microprocessor unit is programmed to make this determination by recognizing when, after release of the fiber, the weight of the weigh pan 34 is no longer decreasing. The microprocessor unit 54 is programmed to determine the essentially exact actual weight of fiber released from the weigh pan 34 during the preceding cycle by obtaining the difference between the empty weight and the full weight, as represented by box C, such actual weight of fiber released being preferably displayed visually on a digital read-out device 70. After this actual weight has been determined, it is compared with the aforesaid preset weight by the microprocessor unit 54, as represented by box D, to determine whether the actual weight of fiber released is the same as or at variance with the desired preset weight. If the actual weight dumped and the preset weight are the same, no adjustment is made to the control system for the next cycle. If, however, this actual weight is greater than or less than the preset weight, the microprocessor unit 54 generates an adjustment signal, represented by box F, and this adjustment signal is utilized to vary the weight of fiber delivered to the weigh pan 34 during the next succeeding cycle by varying the weight setting at which the motor 24 is stopped and the plate 36 closed to discontinue feeding fiber to the weigh pan 34, as represented by box G. This weight setting for the next cycle is adjusted by an amount proportional to the aforesaid difference between the preset weight and the actual weight of fiber dumped during the immediately preceding cycle.

By way of example, let it be assumed that the preset weight for all cycles is twenty-five ounces. If the actual weight of fiber dumped during one cycle is only twenty-three ounces, the microprocessor unit 54 will increase the weight setting for the next cycle and this will result in the motor 24 being stopped and the plate 36 closed when the sensed weight signal transmitted by the load cell 44 reaches a higher level than the actual weight dumped in the preceding cycle. The proportional amount by which the weight setting is varied may be any desired amount, but it has been found that improved results are obtained if the weight setting for a cycle is adjusted to a predetermined level that is greater or less than the actual weight dumped in the preceding cycle by an amount equal to one-half of the difference between the preset weight and the actual weight determined to have been dumped during the preceding cycle. Thus, in the example set forth above where the actual weight dumped is two ounces less than the preset weight, the weight setting for the next cycle would be adjusted upwardly to a level one ounce greater than the actual weight dumped in the preceding cycle. Given the fact that the actual weight dumped will frequently vary, at least to some extent from the preset weight, it has been found that the aforesaid adjustment will result in the actual weight dumped in succeeding cycles evenly and consistently approaching the preset weight, as opposed to the more extreme fluctuations in the actual weights dumped if the adjustment of the weight level is set at levels above and below the actual fiber weight level of the preceding cycle by the full difference between the preset weight and the actual weight dumped during the preceding cycle.

The example given above is exemplary only, and it will be understood that if the actual weight dumped during a given cycle is greater than, rather than less than, the preset weight, the control system of the present invention will lower the predetermined weight level setting from the next cycle in the same manner as that described above.

It will be appreciated from the above that the control system of the present invention serves to regulate the operation of each fiber feeding machine 10 in a manner that results in a generally constant weight of fiber being delivered by each such machine to the conveyor 12 during each reoccurring cycle of each such machine, and any variation between the desired preset weight and the weight of fiber actually dumped during any cycle is immediately compensated for by varying the weight of fiber dumped during the next cycle. Moreover, because the present invention makes an extremely accurate determination of the actual fiber dumped during each cycle by subtracting the empty weight of the weigh pan 34 after dumping from the full weight of the weigh pan 34 before dumping, the weight adjustment for the next cycle is quite reliable in assuring that the actual weight dumped during such next cycle will accurately compensate, by any desired amount, for any variance between the preset weight and actual weight of fiber dumped during the preceding cycle. Accordingly, the control system of the present invention results in essentially uniform and measured quantities of fiber being constantly and continuously delivered to the conveyor 12 and the blending apparatus 14 from each fiber feeding machine 10 during each reoccurring cycle thereof, all of which improves to a significant extent the desired uniformity of the ultimate blend of different fibers obtained from the blending apparatus 14.

The present invention has been described in detail above for purposes of illustration only and is not intended to be limited by this description or otherwise to exclude any variation or equivalent arrangement that would be apparent from, or reasonably suggested by the foregoing disclosure to the skill of the art.

We claim:

1. An apparatus for feeding, weighing and releasing a predetermined quantity of fiber to a conveyor or the like in reoccurring cycles whereby the quantity of fiber released in each cycle is maintained at an essentially constant and preselected level, said apparatus including weigh pan means for receiving and collecting said fiber therein, said weigh pan means having selectively operable means for releasing the fiber collected therein, and fiber feeding means for selectively delivering a quantity of fiber to said weigh pan means, the improvement comprising:
   (a) means for sensing the weight of said fiber collected in said weigh pan means during each said cycle and generating a signal indicative of said weight; and
   (b) control means for receiving said generated signal, determining the actual weight of fiber released from said weigh pan after each release thereof by said releasing means, comparing said actual weight with a constant preset weight corresponding to the weight desired to be released during each said cycle, and controlling said fiber feeding means to vary the weight of fiber delivered to said weigh pan means during the next said cycle by an amount that is a predetermined fractional portion of the difference between said actual weight and said preset weight for the immediately preceding cycle.

2. An apparatus for feeding, weighing and releasing a predetermined quantity of fiber, the improvement defined in claim 1 and further characterized in that said control means establishes, for each said cycle, a predetermined weight level at which said delivery of fiber to said weigh pan by said fiber feeding apparatus is stopped, said predetermined weight level being established in response to said comparison of said actual weight and said preset weight for the immediately preceding cycle.

3. An apparatus for feeding, weighing and releasing a predetermined quantity of fiber, the improvement defined in claim 2 and further characterized in that said control means establishes said predetermined weight level at a level higher than said actual weight for the preceding cycle when said comparison indicates that said actual weight for the preceding cycle is less than said preset weight, and establishes said predetermined weight level at a level lower than said actual weight for the preceding cycle when said comparison indicates that said actual weight for the preceding cycle is greater than said preset weight.

4. An apparatus for feeding, weighing and releasing a predetermined quantity of fiber, the improvement defined in claim 3 and further characterized in that said higher and lower predetermined weight levels established by said control means are different from said actual weight for the preceding cycle by one-half of the difference between said preset weight and said actual weight for the preceding cycle.

5. A method of feeding, weighing and releasing a predetermined quantity of fiber to a conveyor or the like in reoccurring cycles whereby the quantity of fiber released in each cycle is maintained at an essentially constant and preselected level, said method comprising the steps of:
   (a) feeding fiber to a receiver for collection therein until the weight of said collected fiber reaches a predetermined level and then stopping said feeding of fiber;
   (b) releasing said fiber collected in said receiver;
   (c) determining the actual weight of fiber released from said receiver during each cycle, and comparing said actual weight with a constant preset weight; and
   (d) varying said predetermined weight level at which said feeding is stopped during the next succeeding cycle by an amount that is a predetermined fractional portion of the difference between said actual weight and said preset weight for the immediately preceding cycle.

6. A method of feeding, weighing and releasing a predetermined quantity of fiber as defined in claim 5 and further characterized in that said predetermined weight level for each cycle is varied to a higher level than said actual weight for the preceding cycle when said comparison indicates that said actual weight for the preceding cycle is less than said preset weight, and is varied to a lower level than said actual weight for the preceding cycle when said comparison indicates that said actual weight for the preceding cycle is greater than said preset weight.

7. A method of feeding, weighing and releasing a predetermined quantity of fiber as defined in claim 6 and further characterized in that said higher and lower levels of said predetermined weight are different from said actual weight for the preceding cycle by one-half of the difference between said preset weight and said actual weight for the preceding cycle.

8. A method of feeding, weighing and releasing a predetermined quantity of fiber as defined in claim 5 and further characterized in that said step of determining the weight of fiber released from said receiver includes generating signals indicative of the weight of the receiver and any fiber collected therein, sensing the full weight of the receiver prior to said release of said fiber therefrom by recognizing from said signals when the weight of said receiver and fiber is no longer increasing, sensing the empty weight of said receiver after the release of said fiber by recognizing from said signals when the weight of said receiver is no longer decreasing, and obtaining the difference between said full weight and said empty weight to determine the actual weight of fiber released.

* * * * *